United States Patent
Hirazumi (10) Patent No.: US 12,066,086 B2
(45) Date of Patent: Aug. 20, 2024

(54) DIFFERENTIAL ROTATION LIMITING FORCE CONTROL APPARATUS FOR CENTER DIFFERENTIAL

(71) Applicant: SUBARU CORPORATION, Tokyo (JP)

(72) Inventor: Kyosuke Hirazumi, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 157 days.

(21) Appl. No.: 17/751,776

(22) Filed: May 24, 2022

(65) Prior Publication Data

US 2022/0397188 A1 Dec. 15, 2022

(30) Foreign Application Priority Data

Jun. 9, 2021 (JP) ................... 2021-096358

(51) Int. Cl.
*F16H 48/22* (2006.01)
*B60K 17/34* (2006.01)
(Continued)

(52) U.S. Cl.
CPC ........... *F16H 48/22* (2013.01); *B60K 17/346* (2013.01); *F16H 2048/204* (2013.01)

(58) Field of Classification Search
CPC ........... B60W 30/045; B60W 30/1819; B60W 40/103; B60W 50/14; B60W 40/114; B60W 2050/0083; B60W 2520/14; B60W 2540/106; B60W 2540/18; B60W 20/105; B60W 20/125; B60W 20/14; B60L 15/2009; B60L 15/2036; B60L 2220/46; B60L 2240/16; B60L 2240/22; B62D 7/159; F16H 48/22; F16H 59/66; B60G 2400/104; B60G 2400/204; B60K 17/346
See application file for complete search history.

(56) References Cited

U.S. PATENT DOCUMENTS 6,024,182 A * 2/2000 Hamada ................ B60K 6/365
903/910
6,219,610 B1 * 4/2001 Araki .................... B60T 8/1755
701/72
(Continued)

FOREIGN PATENT DOCUMENTS

JP 2007-261483 A 10/2007

*Primary Examiner* — John Kwon
*Assistant Examiner* — Johnny H Hoang
(74) *Attorney, Agent, or Firm* — TROUTMAN PEPPER HAMILTON SANDERS LLP (57) ABSTRACT

A differential rotation limiting force control apparatus for a center differential includes an outwardly headed state detection processor and a limiting force control processor. The outwardly headed state detection processor makes a detection of an outwardly headed state in which a vehicle is cornering with a yaw rate and a side-slip angle of a vehicle body of the vehicle having the same sign. In response to the detection of the outwardly headed state, the limiting force control processor controls a limiting force that limits differential rotation between front and rear wheel driving devices, to reduce a difference between a motive force on a front wheel caused by an output of the travel power source and an absolute value of a braking force on the front wheel caused by internal circulation torque of the center differential.

16 Claims, 5 Drawing Sheets

(51) Int. Cl.
*B60K 17/346* (2006.01)
*F16H 48/20* (2012.01)

(56) References Cited

U.S. PATENT DOCUMENTS

| | | | |
|---|---|---|---|
| 11,364,895 B2* | 6/2022 | Su | B60W 40/109 |
| 2008/0086251 A1* | 4/2008 | Lu | B60T 8/1755 |
| | | | 701/70 |
| 2013/0090810 A1* | 4/2013 | Yoshimoto | B60T 8/17552 |
| | | | 701/41 |
| 2018/0118220 A1* | 5/2018 | Kimura | B60W 10/20 |
| 2018/0208184 A1* | 7/2018 | Sugai | B60L 15/2009 |
| 2019/0293172 A1* | 9/2019 | Shinohara | B60K 17/02 |
| 2021/0240192 A1* | 8/2021 | Zhang | G05D 1/0212 |

\* cited by examiner

DIFFERENTIAL ROTATION LIMITING FORCE CONTROL APPARATUS FOR CENTER DIFFERENTIAL

CROSS-REFERENCE TO RELATED APPLICATION

This application claims priority from Japanese Patent Application No. 2021-096358 filed on Jun. 9, 2021, the entire contents of which are hereby incorporated by reference.

BACKGROUND

The technology relates to a differential rotation limiting force control apparatus for a center differential of an all-wheel-drive (AWD) vehicle.

For example, automobiles such as AWD or four-wheel-drive passenger cars transmit an output of a travel power source, e.g., an engine, to a front wheel driving device and a rear wheel driving device through a center differential. A center differential is a differential mechanism that permits differential rotation between front and rear wheels, i.e., a difference in rotation speed between the front and rear wheels.

A known center differential uses, for example, a planetary gear set and has unequal front-to-rear torque distribution of, for example, other than 50:50.

Moreover, it is known to provide a center differential with a differential rotation limiting device, or an LSD (Limited Slip Differential), that limits differential rotation. It is also known to allow a limiting force generated by the differential rotation limiting device to be variable with, for example, a cornering state of a vehicle.

As a technique related to a motive force distribution control apparatus for a vehicle, for example, Japanese Unexamined Patent Application Publication (JP-A) No. 2007-261483 discloses an on-demand AWD vehicle configured to drive constantly one of front wheels or rear wheels, and transmit a motive force to the other through an electrically controlled coupling. The on-demand AWD vehicle is configured to set a fastening force of the electrically controlled coupling in accordance with wheel speeds, an understeer state, and an oversteer state. The on-demand AWD vehicle is configured to make correction on motive force distribution in accordance with a difference in wheel speed between the front and rear wheels and an acceleration state by an accelerator.

SUMMARY

An aspect of the technology provides a differential rotation limiting force control apparatus for a center differential. The differential rotation limiting force control apparatus is to be mounted on a vehicle including the center differential and a differential rotation limiting device. The center differential is configured to transmit a motive force generated by a travel power source to a front wheel driving device and a rear wheel driving device and permit differential rotation between the front wheel driving device and the rear wheel driving device. The front wheel driving device is configured to drive a front wheel of the vehicle. The rear wheel driving device is configured to drive a rear wheel of the vehicle. The differential rotation limiting device is configured to generate a limiting force that limits the differential rotation. The differential rotation limiting force control apparatus includes an outwardly headed state detection processor and a limiting force control processor. The outwardly headed state detection processor is configured to make a detection of an outwardly headed state in which the vehicle is cornering with a yaw rate and a side-slip angle of a vehicle body of the vehicle having the same sign. The limiting force control processor is configured to control the limiting force, in response to the detection of the outwardly headed state, to reduce a difference between a motive force on the front wheel caused by an output of the travel power source and an absolute value of a braking force on the front wheel caused by internal circulation torque of the center differential.

An aspect of the technology provides a differential rotation limiting force control apparatus for a center differential. The differential rotation limiting force control apparatus is to be mounted on a vehicle including the center differential and a differential rotation limiting device. The center differential is configured to transmit a motive force generated by a travel power source to a front wheel driving device and a rear wheel driving device and permit differential rotation between the front wheel driving device and the rear wheel driving device. The front wheel driving device is configured to drive a front wheel. The rear wheel driving device is configured to drive a rear wheel. The differential rotation limiting device is configured to generate a limiting force that limits the differential rotation. The differential rotation limiting force control apparatus includes an inwardly headed state detection processor and a limiting force control processor. The inwardly headed state detection processor is configured to make a detection of an inwardly headed state in which the vehicle is cornering with a yaw rate and a side-slip angle of a vehicle body of the vehicle having different signs. The limiting force control processor is configured to control the limiting force, in response to the detection of the inwardly headed state, to reduce a difference between a motive force on the rear wheel caused by an output of the travel power source and an absolute value of a braking force on the rear wheel caused by internal circulation torque of the center differential.

An aspect of the technology provides a differential rotation limiting force control apparatus for a center differential. The differential rotation limiting force control apparatus is to be mounted on a vehicle including the center differential and a differential rotation limiting device. The center differential is configured to transmit a motive force generated by a travel power source to a front wheel driving device and a rear wheel driving device and permit differential rotation between the front wheel driving device and the rear wheel driving device. The front wheel driving device is configured to drive a front wheel. The rear wheel driving device is configured to drive a rear wheel. The differential rotation limiting device is configured to generate a limiting force that limits the differential rotation. The differential rotation limiting force control apparatus includes circuitry. The circuitry is configured to make a detection of an outwardly headed state in which the vehicle is cornering with a yaw rate and a side-slip angle of a vehicle body of the vehicle having the same sign. The circuitry is configured to control the limiting force, in response to the detection of the outwardly headed state, to reduce a difference between a motive force on the front wheel caused by an output of the travel power source and an absolute value of a braking force on the front wheel caused by internal circulation torque of the center differential.

An aspect of the technology provides a differential rotation limiting force control apparatus for a center differential. The differential rotation limiting force control apparatus is to be mounted on a vehicle including the center differential and a differential rotation limiting device. The center differential is configured to transmit a motive force generated by a travel power source to a front wheel driving device and a rear wheel driving device and permit differential rotation between the front wheel driving device and the rear wheel driving device. The front wheel driving device is configured to drive a front wheel. The rear wheel driving device is configured to drive a rear wheel. The differential rotation limiting device is configured to generate a limiting force that limits the differential rotation. The differential rotation limiting force control apparatus includes circuitry. The circuitry is configured to make a detection of an inwardly headed state in which the vehicle is cornering with a yaw rate and a side-slip angle of a vehicle body of the vehicle having different signs. The circuitry is configured to control the limiting force, in response to the detection of the inwardly headed state, to reduce a difference between a motive force on the rear wheel caused by an output of the travel power source and an absolute value of a braking force on the rear wheel caused by internal circulation torque of the center differential.

BRIEF DESCRIPTION OF THE DRAWINGS

The accompanying drawings are included to provide a further understanding of the technology and are incorporated in and constitute a part of this specification. The drawings illustrate example embodiments and, together with the specification, serve to explain the principles of the technology.

DETAILED DESCRIPTION

The technique disclosed in JP-A No. 2007-261483 includes, for example, in an understeer state, increasing torque to be transmitted to rear wheels, and decreasing motive torque for front wheels, to increase lateral forces to be generated by tires. In such a technique, motive forces are generated on the front wheels while a driver makes an operation to turn on an accelerator, even in a case with intervention by the control. This inhibits optimal utilization of frictional forces to be generated by the tires, as the lateral forces.

It is desirable to provide a differential rotation limiting force control apparatus for a center differential that makes it possible to increase a lateral force to be generated by a tire when cornering.

In the following, some example embodiments of the technology are described in detail with reference to the accompanying drawings. Note that the following description is directed to illustrative examples of the disclosure and not to be construed as limiting to the technology. Factors including, without limitation, numerical values, shapes, materials, components, positions of the components, and how the components are coupled to each other are illustrative only and not to be construed as limiting to the technology. Further, elements in the following example embodiments which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same reference numerals to avoid any redundant description. In addition, elements that are not directly related to any embodiment of the technology are unillustrated in the drawings.

Description is given of a differential rotation limiting force control apparatus for a center differential according to an embodiment of the technology.

The differential rotation limiting force control apparatus for the center differential according to this embodiment may be provided in, for example, an automobile such as an all-wheel-drive (AWD), four-wheeled passenger car.

Figure 1:
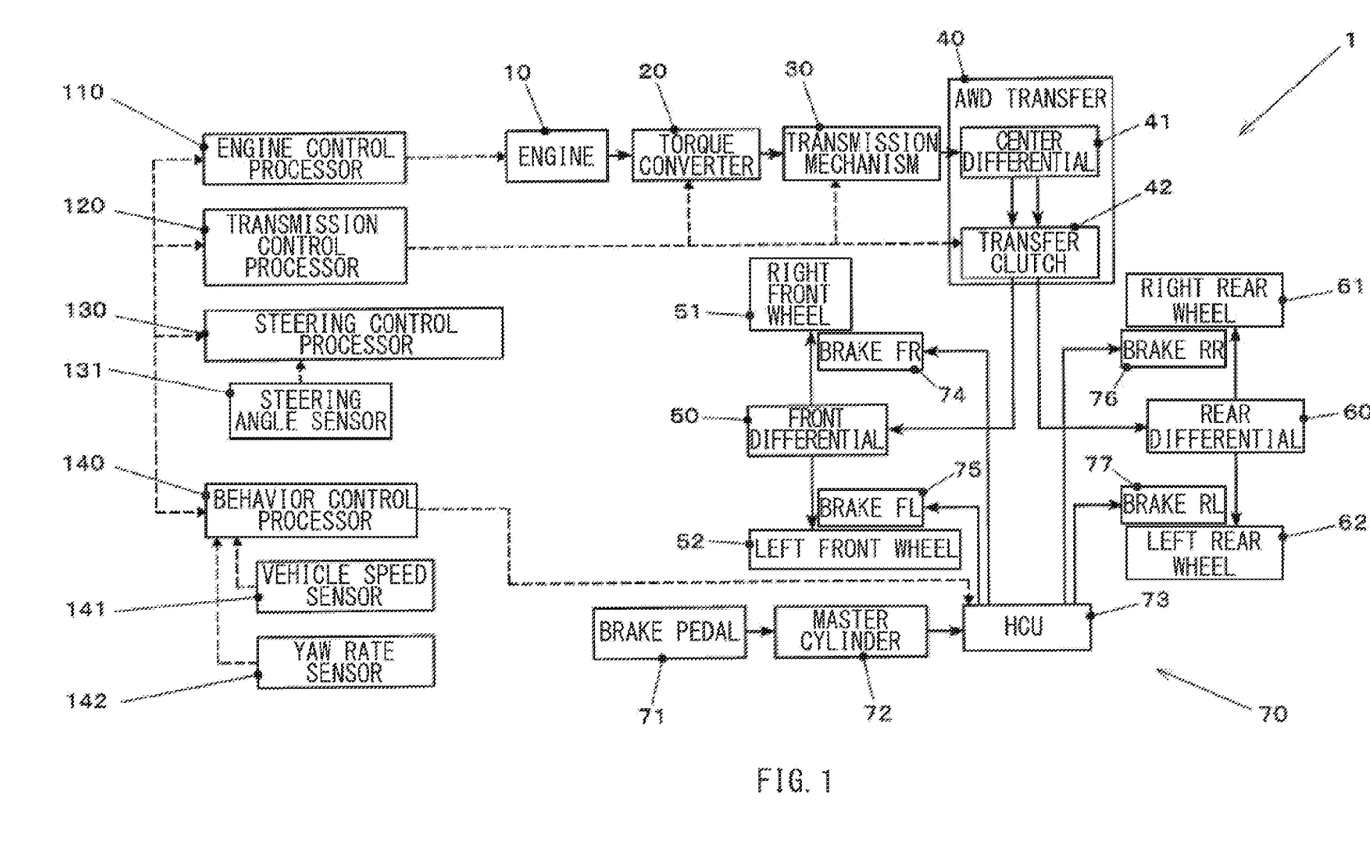
FIG. 1 is a schematic block diagram of a configuration of a vehicle including a differential rotation limiting force control apparatus for a center differential according to an embodiment of the disclosure.

FIG. 1 schematically illustrates a configuration of a vehicle including the differential rotation limiting force control apparatus for the center differential according to this embodiment.

As illustrated in FIG. 1, a vehicle 1 may include, without limitation, an engine 10, a torque converter 20, a transmission mechanism 30, an AWD transfer 40, a front differential 50, and a rear differential 60.

The engine 10 may serve as a travel power source of the vehicle 1. The engine 10 may include, without limitation, an internal combustion engine such as a gasoline engine.

The torque converter 20 may include a fluid coupling that transmits an output of the engine 10 to the transmission mechanism 30. The torque converter 20 may serve as a starting device that allows a vehicle to start from a vehicle speed of zero.

The torque converter 20 may include a lock-up clutch that directly couples input side and output side.

The transmission mechanism 30 may include, without limitation, a continuously variable transmission (CVT) or a stepped AT (Automatic Transmission). The CVT may include a variator including, without limitation, a pair of variable pulleys and a chain or a belt. The stepped AT may include a plurality of rows of planetary gear sets. The transmission mechanism 30 is configured to convert the output of the engine 10 for shifting. The output of the engine 10 may be inputted to the transmission mechanism 30 from the torque converter 20.

An output of the transmission mechanism 30 may be transmitted to the AWD transfer 40.

The AWD transfer 40 may include a motive force transmission device that distributes a motive force inputted from the transmission mechanism 30 to the front differential 50 and the rear differential 60, and transmits the resultant forces to the front differential 50 and the rear differential 60.

The AWD transfer 40 may include, without limitation, a center differential 41 and a transfer clutch 42.

The center differential 41 may include, without limitation, a motive force distribution mechanism. The motive force distribution mechanism may include a composite planetary gear set, and is configured to perform torque distribution to the front differential 50 and the rear differential 60 at a torque distribution ratio of, for example, about 35:65.

Moreover, the center differential 41 may also serve as a differential mechanism that absorbs differential rotation between the front differential 50 and the rear differential 60. The differential rotation between the front differential 50 and the rear differential 60 is caused by, for example, a difference in locus between the front and rear wheels when cornering.

The transfer clutch 42 may include, without limitation, a differential motion limiting mechanism, or an LSD (Limited Slip Differential), that limits differential motion between output units on front wheel side and on rear wheel side of the center differential 41. In one embodiment of the technology, the transfer clutch 42 may serve as a "differential rotation limiting device". The transfer clutch 42 may include, without limitation, a wet multi-plate clutch. The wet multi-plate clutch may be driven by hydraulic pressure or an electromagnetic force. A fastening force, or a clutch crimping force, of the wet multi-plate clutch may be controlled by a transmission control processor 120 described later. The fastening force is also referred to as differential motion limiting torque, or a differential rotation limiting force.

The AWD transfer 40 is configured to change the fastening force of the transfer clutch 42, to make continuous adjustment of a motive force distribution ratio between the front wheel side and the rear wheel side, for example, from 35:65 to 50:50.

The front differential 50 may make final deceleration of a front wheel side motive force transmitted from the AWD transfer 40, while transmitting the front wheel side motive force to a right front wheel 51 and a left front wheel 52. Moreover, the front differential 50 may serve as a differential mechanism that absorbs differential rotation between the right front wheel 51 and the left front wheel 52.

In one embodiment of the technology, the front differential 50, together with an unillustrated drive shaft or the like, may serve as a "front wheel driving device".

The rear differential 60 may make final deceleration of a rear wheel side motive force transmitted from the AWD transfer 40 through an unillustrated propeller shaft, while transmitting the rear wheel side motive force to a right rear wheel 61 and a left rear wheel 62. Moreover, the rear differential 60 may also serve as a differential mechanism that absorbs differential rotation between the right rear wheel 61 and the left rear wheel 62.

In one embodiment of the technology, the rear differential 60, together with the propeller shaft and an unillustrated drive shaft or the like, may serve as a "rear wheel driving device".

The vehicle 1 may further include, without limitation, a brake device 70 as a braking device.

The brake device 70 may include, without limitation, a brake pedal 71, a master cylinder 72, a hydraulic control unit (HCU) 73, a brake FR 74, a brake FL 75, a brake RR 76, and a brake RL 77.

The brake pedal 71 may include an input unit that allows a driver to make a brake operation.

The master cylinder 72 may be coupled to the brake pedal 71. The master cylinder 72 is configured to pressurize a brake fluid in response to stepping down of the brake pedal 71. The master cylinder 72 may include a vacuum doubling device that amplifies an input from the brake pedal 71 with the use of an intake pipe negative pressure of the engine 10.

The hydraulic control unit 73 may individually increase or decrease fluid pressure of the brake fluid to be supplied to a wheel cylinder of each wheel for purposes of, for example, an anti-lock brake control, a yaw control, and an automatic brake control.

The hydraulic control unit 73 may include, without limitation, an electric pump and a control valve. The electric pump may pressurize the brake fluid. The control valve may individually adjust the fluid pressure of each wheel cylinder.

The brake FR 74, the brake FL 75, the brake RR 76, and the brake RL 77 are provided respectively on the right front wheel 51, the left front wheel 52, the right rear wheel 61, and the left rear wheel 62. Each brake may include, without limitation, a disk-shaped rotor and a caliper. The disk-shaped rotor may rotate with the wheel. The caliper may pressurize a pad into contact with the rotor. The caliper may include, without limitation, the wheel cylinder that presses the pad by the fluid pressure of the brake fluid supplied from the hydraulic control unit 73.

The vehicle 1 may include, without limitation, an engine control processor 110, the transmission control processor 120, a steering control processor 130, and a behavior control processor 140. Each processor may include, without limitation, a data processor such as a CPU (Central Processing Unit), a storage such as a RAM (Random Access Memory) and/or a ROM (Read Only Memory), input and output interfaces, and a bus that couples them together.

The processors may be communicably coupled, for example, through an in-vehicle LAN (Local Area Network) such as a CAN (Controller Area Network) communication system, or directly.

The engine control processor 110 may make a comprehensive control of the engine 10 and its auxiliaries.

The engine control processor 110 may make an output adjustment of the engine 10.

The engine control processor 110 may provide setting of driver request torque on the basis of, for example, an amount of the driver's accelerator operation. The engine control processor 110 may also control, for example, a throttle plate position, an amount of fuel injection, fuel injection timing, ignition timing, valve timing, an EGR (Exhaust Gas Recirculation) rate, and an oversupply pressure of the engine 10, to allow actual torque of the engine 10 to match the driver request torque.

The transmission control processor 120 may make, for example, a shifting control and a forward and reverse switching control in the transmission mechanism 30, and a fastening force control, or a limiting force control, of the lock-up clutch in the torque converter 20.

Moreover, the transmission control processor 120 may change the fastening force of the transfer clutch 42 of the AWD transfer 40, to change the differential rotation limiting force, and to control the motive force distribution ratio between the front wheel side and the rear wheel side, and internal circulation torque.

In one embodiment of the technology, the transmission control processor 120 may serve as a "limiting force control processor" of a "differential rotation limiting force control apparatus for a center differential".

The steering control processor 130 may control an electric power steering (EPS) device. The EPS device may be provided in an unillustrated steering apparatus.

The steering control processor 130 may control, for example, an electric motor that generates assisting power, in accordance with steering torque inputted by the driver through a steering wheel.

To the steering control processor 130, a steering angle sensor 131 may be coupled. The steering angle sensor 131 may detect a steering angle in the steering apparatus.

The behavior control processor 140 may control the hydraulic control unit 73 and control individually the fluid pressure of the wheel cylinders of the brake FR 74, the brake FL 75, the brake RR 76, and the brake RL 77. The fluid pressure of the wheel cylinder correlates with a braking force.

The behavior control processor 140 may make, for example, the anti-lock brake control and a behavior control. The anti-lock brake control includes, in a case of a wheel lock caused by braking, periodically depressurizing the fluid pressure of the wheel cylinder of the relevant wheel, to restore the rotation of the wheel. The behavior control includes, in a case of oversteer behavior or understeer behavior, generating a difference in the braking force between the left and right wheels, to suppress a yaw moment in a direction in which such behavior is suppressed.

To make these controls, a vehicle speed sensor 141 and a yaw rate sensor 142 may be coupled to the behavior control processor 140. The vehicle speed sensor 141 may individually detect a rotation speed of each wheel. The yaw rate sensor 142 may detect a yaw rate of a vehicle body.

The behavior control processor 140 may acquire data regarding the steering angle detected by the steering angle sensor 131 from the steering control processor 130, to make a detection of an outwardly headed state and an inwardly headed state. The outwardly headed state means a state in which the front of the vehicle is directed outwardly of cornering with respect to the vehicle's direction of travel. The front of the vehicle means front side of the vehicle body in a direction of a longitudinal axis of the vehicle body. The inwardly headed state means a state in which the front of the vehicle is directed inwardly of cornering with respect to the vehicle's direction of travel.

In one embodiment of the technology, the behavior control processor 140 may serve as an "outwardly headed state detection processor" and an "inwardly headed state detection processor".

Figure 2A:
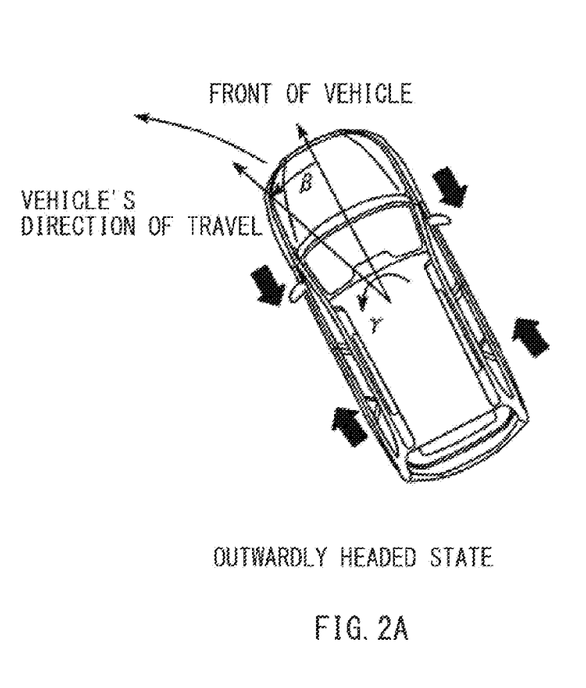
FIGS. 2A and 2B schematically illustrate states of internal circulation torque in an outwardly headed state and an inwardly headed state.
Figure 2B:
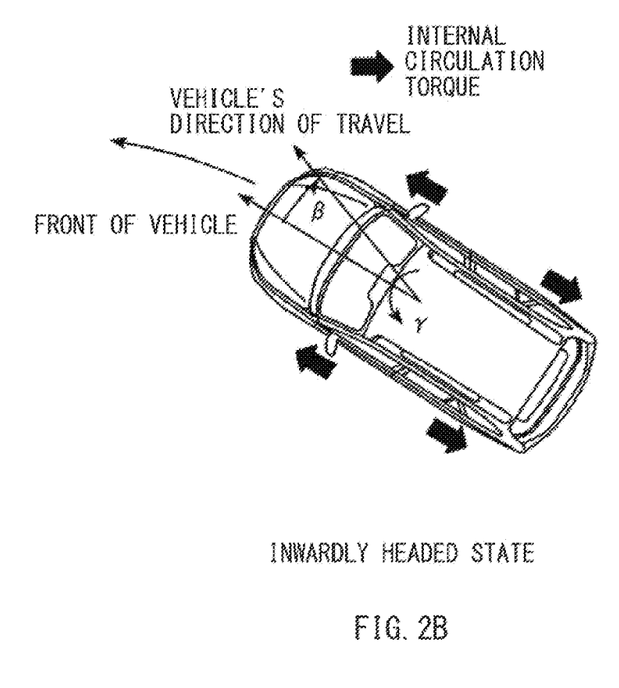

FIGS. 2A and 2B are schematic diagrams of states of the internal circulation torque in the outwardly headed state and the inwardly headed state.

In the following description, as for a side-slip angle β and a yaw rate γ of the vehicle, positive counterclockwise, and negative clockwise, in plan view with the vehicle viewed from above.

FIG. 2A illustrates the outwardly headed state when cornering to the left.

The outwardly headed state is a state in which the side-slip angle β and the yaw rate γ of the vehicle have the same sign. That is, both positive when cornering to the left, and both negative when cornering to the right.

The side-slip angle β of the vehicle is given by the following expression 1.

$$\beta = \left( \frac{1 - \frac{m}{2l} \frac{l_f}{l_r K_r} V^2}{1 - \frac{m}{2l^2} \frac{l_f K_f - l_r K_r}{K_f K_r} V^2} \right) \frac{l_r}{l} \delta$$

β: Side-slip angle, γ: yaw rate, V: vehicle speed, δ: steering angle, m: vehicle weight, l: wheelbase, lf: longitudinal distance from the center of gravity to front wheel axle, lr: longitudinal distance from the center of gravity to rear wheel axle, Kf: front wheel equivalent cornering power (CP), and Kr: rear wheel equivalent cornering power (CP)

The yaw rate, the vehicle speed, and the steering angle may be detected in real time respectively by the yaw rate sensor 142, the vehicle speed sensor 141, and the steering angle sensor 131.

The vehicle weight m and subsequent numerical values may be set in advance on the basis of vehicle specifications.

In the outwardly headed state, comparison between the right front wheel 51 and the right rear wheel 61, and comparison between the left front wheel 52 and the left rear wheel 62 indicate that a radius of bend at the front wheel is greater than a radius of bend at the rear wheel. In other words, the front wheel moves outwardly of the rear wheel when cornering. Accordingly, the rotation speed of the front wheel is greater than the rotational speed of the rear wheel.

In this case, the internal circulation torque from the front differential 50 to the rear differential 60 is generated through the AWD transfer 40.

As a result, as denoted by arrows in FIG. 2A, because of the internal circulation torque, the braking forces are generated on the front wheels while the motive forces are generated on the rear wheels.

FIG. 2B illustrates the inwardly headed state when cornering to the left.

The inwardly headed state is a state in which the side-slip angle β and the yaw rate γ of the vehicle have different signs. That is, when cornering to the left, the side-slip angle β is negative and the yaw rate γ is positive. When cornering to the right, the side-slip angle β is positive and the yaw rate γ is negative.

In the inwardly headed state, comparison between the right front wheel 51 and the right rear wheel 61, and comparison between the left front wheel 52 and the left rear wheel 62 indicate that the radius of bend at the rear wheel is greater than the radius of bend at the front wheel. In other words, the rear wheel moves outwardly of the front wheel when cornering. Accordingly, the rotation speed of the rear wheel is greater than the rotation speed of the front wheel.

In this case, the internal circulation torque from the rear differential 60 to the front differential 50 is generated through the AWD transfer 40.

As a result, as denoted by arrows in FIG. 2B, because of the internal circulation torque, the motive forces are generated on the front wheels while the braking forces are generated on the rear wheels.

In this embodiment, the limiting force, or a limitation rate, for the center differential 41 by the transfer clutch 42 is controlled in view of the internal circulation torque of the AWD transfer 40 described above. This leads to an increase in the lateral forces to be generated by tires of the front wheels in the outwardly headed state, and an increase the lateral forces to be generated by tires of the rear wheels in the inwardly headed state.

Figure 3:
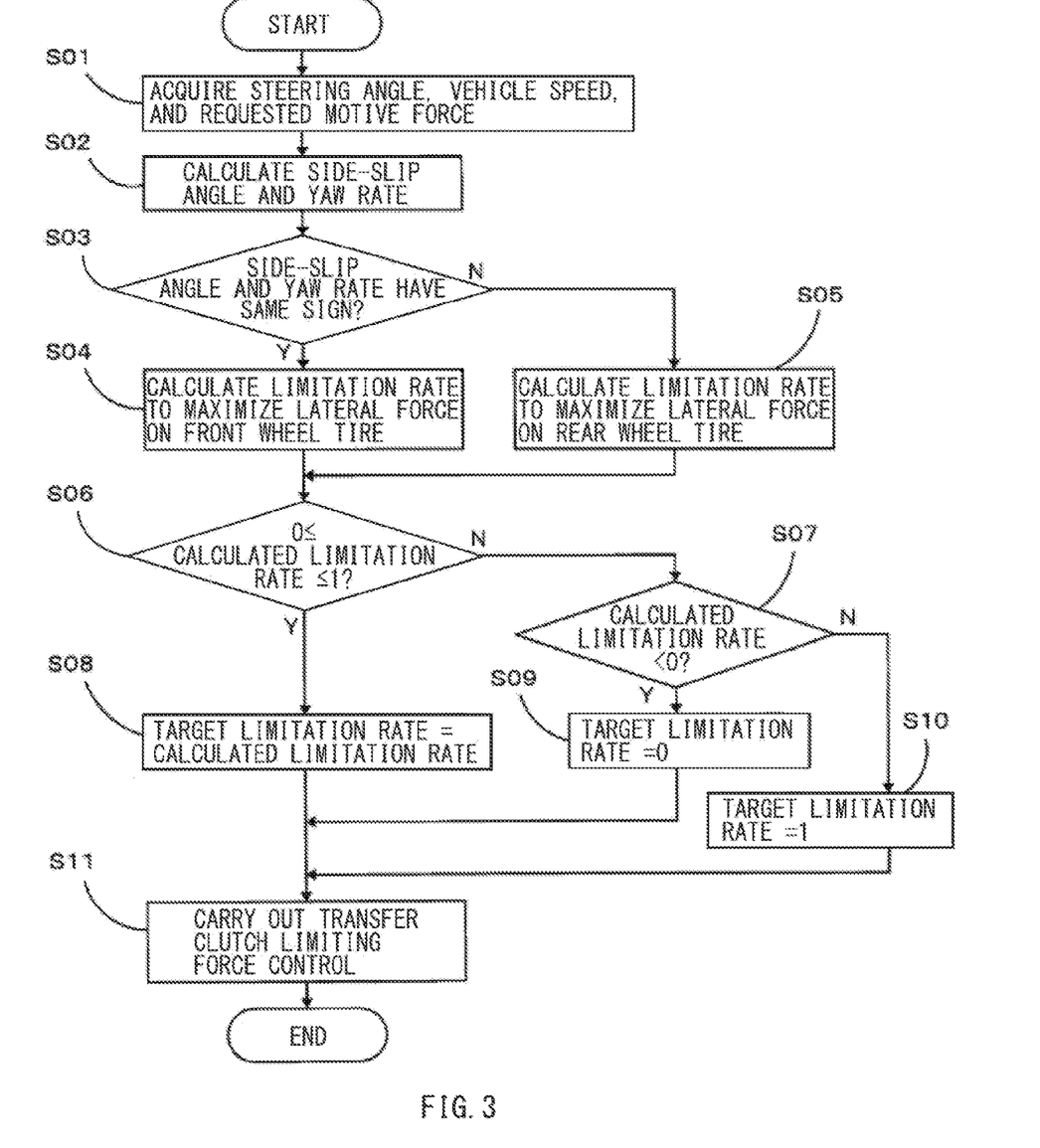
FIG. 3 is a flowchart of a differential rotation limiting force control for the center differential in the embodiment.

FIG. 3 is a flowchart of a differential rotation limiting force control for the center differential in this embodiment.

In the following, description is given step by step.

<Step S01: Acquire Steering Angle, Vehicle Speed, and Requested Motive Force>

First, the behavior control processor 140 may acquire various parameters to be involved in the control, from various sensors. In one embodiment of the technology, the behavior control processor 140 may serve as the "outwardly headed state detection processor" and the "inwardly headed state detection processor".

The behavior control processor 140 may acquire data regarding the steering angle δ detected by the steering angle sensor 131, from the steering control processor 130.

Moreover, the behavior control processor 140 may acquire data regarding the vehicle speed V detected by the vehicle speed sensor 141.

Furthermore, the behavior control processor 140 may acquire data regarding the driver request torque, i.e., a requested motive force, from the engine control processor 110.

Thereafter, the flow may be allowed to proceed to step S02.

<Step S02: Calculate Side-Slip Angle and Yaw Rate>

The behavior control processor 140 may calculate the side-slip angle β and the yaw rate γ of the vehicle, with the use of the expression 1 described above and an output of the yaw rate sensor 142.

Thereafter, the flow may be allowed to proceed to step S03.

<Step S03: Determine Outwardly Headed State and Inwardly Headed State>

The behavior control processor 140 may compare the signs of the side-slip angle β and the yaw rate γ calculated in step S02.

In a case with the side-slip angle β and the yaw rate γ having the same sign, the behavior control processor 140 may determine the outwardly headed state, and the flow may be allowed to proceed to step S04.

In a case with the side-slip angle β and the yaw rate γ having the different signs, the behavior control processor 140 may determine the inwardly headed state, and the flow may be allowed to proceed to step S05.

<Step S04: Calculate Limitation Rate that Maximizes Lateral Force on Front Wheel Tire>

In response to the determination of the outwardly headed state in the behavior control processor 140, the transmission control processor 120 may calculate the limitation rate of the transfer clutch 42 that maximizes the lateral force to be generated by the tire of the front wheel, i.e., the limitation rate that maximizes the lateral force on the front wheel tire.

The limitation rate is a parameter indicating the limiting force, or the fastening force, of the transfer clutch 42. The limitation rate assumes 0 in a free state in which no limiting force is generated except for friction that is inevitably generated. The limitation rate assumes 1 in a locked state in which no differential rotation is permitted.

The braking motive force Fi caused by the internal circulation torque is given by the following expression 2.

$$F_i = p \cdot K_x(\mu) \cdot \frac{\gamma l}{V} \beta \quad (2)$$

To maximize the lateral force to be generated by the tire of the front wheel, it suffices to balance the motive force based on the driver's request and the braking force caused by the internal circulation torque, or to equalize their absolute values, to bring a total motive force on the front wheel in the following expression 3 to zero.

$$F_{f\_total} = \alpha F_d - F_i \quad (3)$$
$$= \alpha F_d - p \cdot K_x(\mu) \cdot \frac{rl}{V} \beta$$

Ff_total: Total motive force on front wheel, Fd: motive force applied by the driver, Fi: braking motive force caused by internal circulation torque, α: front-to-rear motive force distribution, or ratio of front wheel motive force to total motive force The limitation rate p in a case where the right side of the expression 3 becomes zero is expressed by the following expression 4.

$$p = \frac{\alpha F_d V}{K_x(\mu) r l \beta} \quad (4)$$

After calculating the differential rotation limitation rate p using the expression 4, the flow may be allowed to proceed to step S06.

<Step S05: Calculate Limitation Rate that Maximizes Lateral Force on Rear Wheel Tire>

In response to the determination of the inwardly headed state in the behavior control processor 140, the transmission control processor 120 may calculate the limitation rate of the transfer clutch 42 that maximizes the lateral force to be generated by the tire of the rear wheel, i.e., the limitation rate that maximizes the lateral force on the rear wheel tire.

The limitation rate p is expressed by the following expression 5.

$$p = -\frac{(1-\alpha)F_d V}{K_x(\mu) r l \beta} \quad (5)$$

After calculating the differential rotation limitation rate p using the expression 5, the flow may be allowed to proceed to step S06.

<Step S06: Determine Upper Limit and Lower Limit of Calculated Limitation Rate>

The transmission control processor 120 may determine whether or not the limitation rate p calculated in step S04 or S05 is equal to or greater than 0 and equal to or smaller than 1. In other words, the transmission control processor 120 may determine whether or not the calculated limitation rate p falls within a range in which the transfer clutch 42 is controllable.

In a case where the limitation rate p is equal to or greater than 0 and equal to or smaller than 1, the flow may be allowed to proceed to step S08. Otherwise, the flow may be allowed to proceed to step S07.

<Step S07: Determine Lower Limit of Calculated Limitation Rate>

The transmission control processor 120 may determine whether or not the limitation rate p calculated in step S04 or S05 is smaller than 0.

In a case where the limitation rate p is smaller than 0, the flow may be allowed to proceed to step S09. Otherwise, the flow may be allowed to proceed to step S10, on the assumption that the limitation rate p is greater than 1.

<Step S08: Set Target Limitation Rate to Calculated Limitation Rate>

The transmission control processor 120 may set a target limitation rate to the limitation rate p calculated in step S04 or S05. The target limitation rate is used in the limiting force control of the transfer clutch 42.

Thereafter, the flow may be allowed to proceed to step S11.

<Step S09: Set Target Limitation Rate to Zero>

The transmission control processor 120 may set the target limitation rate to zero (0).

Thereafter, the flow may be allowed to proceed to step S11.

<Step S10: Set Target Limitation Rate to 1>

The transmission control processor 120 may set the target limitation rate to 1.

Thereafter, the flow may be allowed to proceed to step S11.

<Step S11: Carry out Limiting Force Control of Transfer Clutch>

The transmission control processor 120 may control the limiting force, or the fastening force, of the transfer clutch 42 on the basis of the target limitation rate thus set.

Thereafter, a series of processes may be ended, and the flow may be allowed to return.

In the following, description is given of effects of the differential rotation limiting force control for the center differential described above.

First, an accelerator-on state in the outwardly headed state is described. The accelerator-on state is a state in which the engine 10 is generating motive torque.

This case typically assumes low-speed cornering with a small radius of bend, on a road surface with a relatively high coefficient of friction (0.

In this case, it is desirable to enhance head turning performance of the vehicle.

Figure 4A:
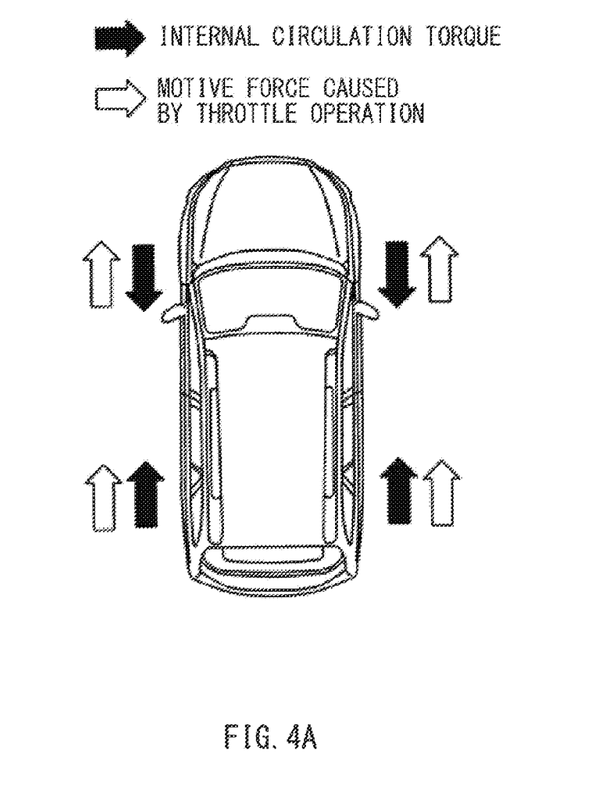
FIGS. 4A and 4B schematically illustrate states of braking motive forces on front wheels and rear wheels in the outwardly headed state in the embodiment.
Figure 4B:
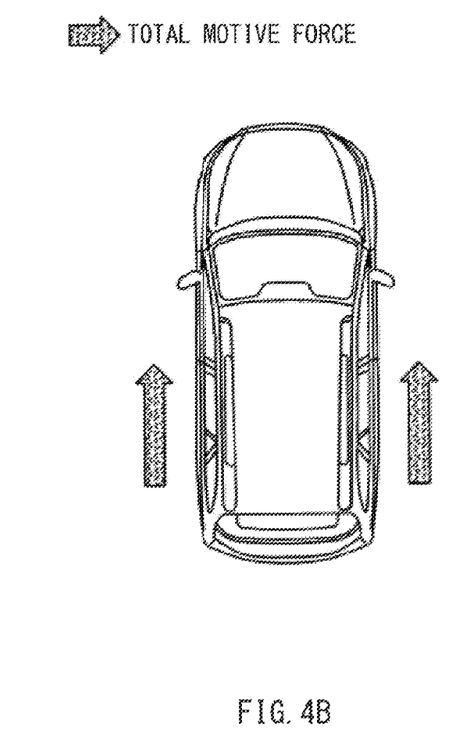

FIGS. 4A and 4B are schematic diagrams of states of the braking motive forces on the front wheels and the rear wheels in the outwardly headed state in this embodiment.

FIG. 4A separately illustrates the motive forces caused by a throttle operation and the braking motive forces caused by the internal circulation torque. FIG. 4B illustrates total braking motive forces as their composite. The same applies to FIGS. 5A and 5B. As described above, in the outwardly headed state, by the internal circulation torque, the braking forces are generated on the front wheels while the motive forces are generated on the rear wheels.

In the meanwhile, the motive force requested by the driver's accelerator operation is transmitted as the motive force to the front and rear wheels at the distribution ratio set by the transmission control processor 120 through the AWD transfer 40.

In this embodiment, the differential rotation limiting force is controlled, to balance the motive forces requested by the driver on the right front wheel 51 and the left front wheel 52, and the braking forces caused by the internal circulation torque on the right front wheel 51 and the left front wheel 52, and to bring the braking motive forces on the right front wheel 51 and the left front wheel 52 to zero. The braking motive forces on the right front wheel 51 and the left front wheel 52 are longitudinal forces to be generated by the tires. Hence, it is possible to use frictional forces to be generated by the tires of the right front wheel 51 and the left front wheel 52, as the lateral forces.

This allows the right front wheel 51 and the left front wheel 52 to be able to generate high cornering forces, leading to enhancement in the head turning performance of the vehicle.

Next, the accelerator-on state in the inwardly headed state is described. The accelerator-on state is the state in which the engine 10 is generating the motive torque.

This case typically assumes high-speed cornering with a large radius of bend, on a road surface with a relatively low coefficient of friction.

In this case, it is desirable to lower possibility of spinning of the vehicle.

Figure 5A:
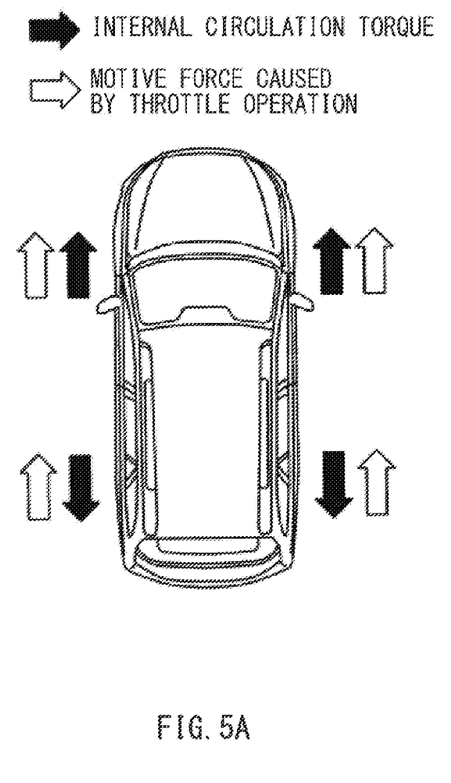
FIGS. 5A and 5B schematically illustrate states of the braking motive forces on the front wheels and the rear wheels in the inwardly headed state in the embodiment.
Figure 5B:
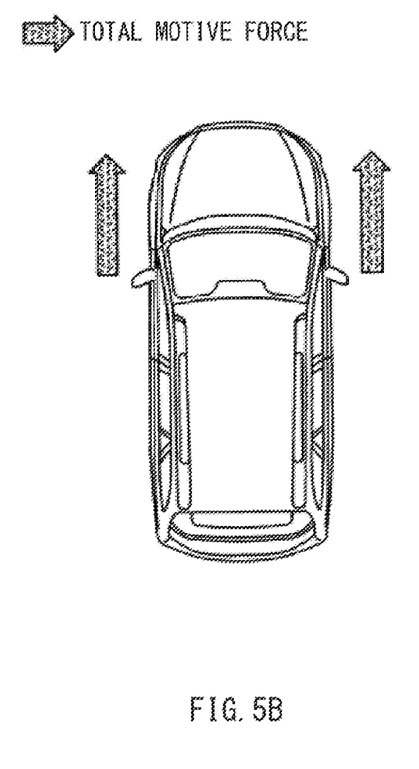

FIGS. 5A and 5B are schematic diagrams of the states of the braking motive forces on the front wheels and the rear wheels in the inwardly headed state in this embodiment.

As described above, in the inwardly headed state, by the internal circulation torque, the motive forces are generated on the front wheels while the braking forces are generated on the rear wheels.

In the meanwhile, the motive force requested by the driver's accelerator operation is transmitted as the motive force to the front and rear wheels at the distribution ratio set by the transmission control processor 120 through the AWD transfer 40.

In this embodiment, the differential rotation limiting force is controlled, to balance the motive forces requested by the driver on the right rear wheel 61 and the left rear wheel 62, and the braking forces caused by the internal circulation torque on the right rear wheel 61 and the left rear wheel 62, and to bring the braking motive forces on the right rear wheel 61 and the left rear wheel 62 to zero. The braking motive forces on the right rear wheel 61 and the left rear wheel 62 are longitudinal forces to be generated by the tires. Hence, it is possible to use frictional forces to be generated by the tires of the right rear wheel 61 and the left rear wheel 62, as the lateral forces.

This allows the right rear wheel 61 and the left rear wheel 62 to be able to generate high cornering forces, leading to enhanced stability of the vehicle and prevention of spinning of the vehicle.

Next, an accelerator-off state regardless of the outwardly headed state or the inwardly headed state is described. The accelerator-off state is a state in which the engine 10 is not generating the motive torque.

In this case, the driver does not request the motive force and it is assumed that the driver wants stable cornering.

In this embodiment, in such a case, the target limitation rate may be set to zero (0). This brings the transfer clutch 42 to the free state, causing no internal circulation torque to be generated. Hence, it is possible to reduce the longitudinal forces to be generated on the front and rear wheels. In this case, both on the front wheels and on the rear wheels, the longitudinal forces include only the braking forces caused by engine braking and the brake device 70.

This provides the frictional forces on the front and rear wheels with a greater margin left for the lateral forces, leading to stable cornering.

Moreover, on the occasion of an escape from a corner exit, i.e., at the end of cornering, it is desirable to accelerate the vehicle stably, while increasing the motive forces on the four wheels.

In this embodiment, both the yaw rate and the side-slip angle of the vehicle approaches zero (0). This leads to an increase in the target limitation rate to be set, and eventually, the target limitation rate is brought to 1, i.e., the locked state.

Hence, it is possible to transmit the motive forces to the road surface with the effective utilization of the frictional forces on the four wheels, leading to stable acceleration.

Although some example embodiments of the technology have been described in the forgoing by way of example with reference to the accompanying drawings, the technology is by no means limited to the example embodiments described above. It should be appreciated that modifications and alterations may be made by persons skilled in the art without departing from the scope as defined by the appended claims. The use of the terms first, second, etc. does not denote any order or importance, but rather the terms first, second, etc. are used to distinguish one element from another. The technology is intended to include such modifications and alterations in so far as they fall within the scope of the appended claims or the equivalents thereof.

(1) The configurations of the vehicle and the differential rotation limiting force control apparatus for the center differential is not limited to the forgoing embodiments, but they may be changed as appropriate.

For example, in the forgoing embodiments, the engine may serve as a travel power source, but this is non-limiting. The technology is also applicable to an engine-electric hybrid vehicle and a vehicle including only an electric motor as a travel power source.

(2) In the forgoing embodiments, for example, the center differential of the planetary gear type is used, but this is non-limiting. For example, the center differential of other kinds, e.g., a bevel gear type, may be used.

(3) The method of obtaining the side-slip angle of the vehicle and the mathematical expressions to obtain the limitation rate are not limited to those of the forgoing embodiments, but they may be changed as appropriate. For example, in the forgoing embodiments, the equivalent CPs of the tires of the front and rear wheels are held in advance as known values. Instead, the equivalent CPs may be configured to be sequentially estimated on the basis of, for example, the behavior of the vehicle.

(4) In the forgoing embodiments, the intervention by the control is made in accordance with the outwardly headed state and the inwardly headed state. However, a simple configuration may be also employed in which the intervention by the control is made in either of these states.

According to the aspects of the technology, a differential rotation limiting force control apparatus for a center differential is provided. The differential rotation limiting force control apparatus is to be mounted on a vehicle including the center differential and a differential rotation limiting device. The center differential is configured to transmit a motive force generated by a travel power source to a front wheel driving device and a rear wheel driving device and permit differential rotation between the front wheel driving device and the rear wheel driving device. The front wheel driving device is configured to drive a front wheel. The rear wheel driving device is configured to drive a rear wheel. The differential rotation limiting device is configured to generate a limiting force that limits the differential rotation. The differential rotation limiting force control apparatus includes an outwardly headed state detection processor and a limiting force control processor. The outwardly headed state detection processor is configured to make a detection of an outwardly headed state in which the vehicle is cornering with a yaw rate and a side-slip angle of a vehicle body of the vehicle having the same sign. The limiting force control processor is configured to control the limiting force, in response to the detection of the outwardly headed state, to reduce a difference between a motive force on the front wheel caused by an output of the travel power source and an absolute value of a braking force on the front wheel caused by internal circulation torque of the center differential.

Generally, in a vehicle including a center differential, in a case with a difference in rotation speed between a front wheel and a rear wheel, internal circulation torque is transmitted from the wheel at higher rotation speed to the wheel at lower rotation speed.

In the outwardly headed state, the yaw rate and the side-slip angle of the vehicle body have the same sign. In the outwardly headed state, the vehicle assumes a posture in which the front of the vehicle is directed outwardly of cornering. The front of the vehicle means front side of the vehicle body in a direction of a longitudinal axis of the vehicle body. In this case, a radius of bend at the front wheel is greater than a radius of bend at the rear wheel. Accordingly, the rotation speed of the front wheel is greater than the rotational speed of the rear wheel.

In this case, because of the internal circulation torque, the braking force is generated on the front wheel while the motive force is generated on the rear wheel.

Moreover, magnitude of the internal circulation torque varies with the limiting force of longitudinal differential rotation of the center differential.

In one aspect of the technology, the limiting force control processor may control the limiting force, in response to the detection of the outwardly headed state, to reduce the difference between the motive force on the front wheel caused by the output of the travel power source and the absolute value of the braking force on the front wheel caused by the internal circulation torque of the center differential.

This makes it possible to reduce the absolute value of the braking motive force to be transmitted by the front wheel to the road surface, leading to an increase in a lateral force to be generated by a tire of the front wheel. Hence, it is possible to enhance head turning performance of the vehicle.

In one aspect of the technology, the limiting force control processor may control the limiting force, in response to the detection of the outwardly headed state, to equalize the motive force on the front wheel caused by the output of the travel power source and the absolute value of the braking force on the front wheel caused by the internal circulation torque of the center differential.

Hence, it is possible to use substantially all the frictional force to be generated by the tire of the front wheel, as the lateral force, making it possible to promote the forgoing effects.

In one aspect of the technology, an inwardly headed state detection processor may be further provided. The inwardly headed state detection processor may make a detection of an inwardly headed state in which the vehicle is cornering with the yaw rate and the side-slip angle of the vehicle body of the vehicle having different signs. The limiting force control processor may control the limiting force, in response to the detection of the inwardly headed state, to reduce a difference between a motive force on the rear wheel caused by the output of the travel power source and an absolute value of a braking force on the rear wheel caused by the internal circulation torque of the center differential.

According to an aspect of the technology, a differential rotation limiting force control apparatus for a center differential is provided. The differential rotation limiting force control apparatus is to be mounted on a vehicle including the center differential and a differential rotation limiting device. The center differential is configured to transmit a motive force generated by a travel power source to a front wheel driving device and a rear wheel driving device and permit differential rotation between the front wheel driving device and the rear wheel driving device. The front wheel driving device is configured to drive a front wheel. The rear wheel driving device is configured to drive a rear wheel. The differential rotation limiting device is configured to generate a limiting force that limits the differential rotation. The differential rotation limiting force control apparatus includes an inwardly headed state detection processor and a limiting force control processor. The inwardly headed state detection processor is configured to make a detection of an inwardly headed state in which the vehicle is cornering with a yaw rate and a side-slip angle of a vehicle body of the vehicle having different signs. The limiting force control processor is configured to control the limiting force, in response to the detection of the inwardly headed state, to reduce a difference between a motive force on the rear wheel caused by an output of the travel power source and an absolute value of a braking force on the rear wheel caused by internal circulation torque of the center differential.

In the inwardly headed state, the yaw rate and the side-slip angle of the vehicle body have the different signs. In the inwardly headed state, the vehicle assumes a posture in which the front of the vehicle is directed inwardly with respect to cornering. In this case, the radius of bend at the rear wheel is greater than the radius of bend at the front wheel. Accordingly, the rotation speed of the rear wheel is greater than the rotational speed of the front wheel.

In this case, because of the internal circulation torque, the motive force is generated on the front wheel while the braking force is generated on the rear wheel.

According to the aspects of the technology, in the inwardly headed state, the limiting force is controlled, to decrease the difference between the absolute value of the braking force generated on the rear wheel by the internal circulation torque and the motive force on the rear wheel caused by the output of the travel power source. Hence it is possible to decrease the absolute value of the braking motive force to be transmitted by the rear wheel to the road surface, and to increase the lateral force to be generated by the tire of the rear wheel. This leads to enhanced stability of the vehicle and prevention of spinning of the vehicle.

In one aspect of the technology, the limiting force control processor may control the limiting force, in response to the detection of the inwardly headed state, to equalize the motive force on the rear wheel caused by the output of the travel power source and the absolute value of the braking force on the rear wheel caused by the internal circulation torque of the center differential.

Hence, it is possible to use substantially all the frictional force to be generated by the tire of the rear wheel, as the lateral force, and to promote the forgoing effects.

As described above, according to the aspects of the technology, it is possible to provide the differential rotation limiting force control apparatus for the center differential that makes it possible to increase the lateral force to be generated by the tire when cornering.

The transmission control processor 120 and the behavior control processor 140 illustrated in FIG. 1 are implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of the transmission control processor 120 and the behavior control processor 140 illustrated in FIG. 1. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the nonvolatile memory may include a ROM and a NVRAM. The ASIC is an integrated circuit (IC) customized to perform, and the FPGA is an integrated circuit designed to be configured after manufacturing in order to perform, all or a part of the functions of the transmission control processor 120 and the behavior control processor 140 illustrated in FIG. 1.

The invention claimed is:

1. A differential rotation limiting force control apparatus for a center differential, to be mounted on a vehicle including the center differential and a differential rotation limiting device, the center differential being configured to transmit a motive force generated by a travel power source to a front wheel driving device and a rear wheel driving device and permit differential rotation between the front wheel driving device and the rear wheel driving device, the front wheel driving device being configured to drive a front wheel of the vehicle, the rear wheel driving device being configured to drive a rear wheel of the vehicle, the differential rotation limiting device being configured to generate a limiting force that limits the differential rotation, the differential rotation limiting force control apparatus comprising:
an outwardly headed state detection processor configured to make a detection of an outwardly headed state based on i) a yaw rate of a vehicle body of the vehicle, ii) a vehicle speed and iii) a steering angle, the yaw rate being detected by a yaw rate sensor of the vehicle, the vehicle speed being detected by a vehicle speed sensor of the vehicle, the steering angle being detected by a steering sensor of the vehicle, the outwardly headed state being a state in which i) the vehicle is cornering and ii) a front side of the vehicle body is directed outwardly of cornering with respect to a vehicle's direction of travel; and
a limiting force control processor configured to control the limiting force, in response to the detection of the outwardly headed state, to reduce a difference between a motive force on the front wheel caused by an output of the travel power source and an absolute value of a braking force on the front wheel caused by internal circulation torque of the center differential.

2. The differential rotation limiting force control apparatus for the center differential according to claim 1, wherein
the limiting force control processor is configured to control the limiting force, in response to the detection of the outwardly headed state, to equalize the motive force on the front wheel caused by the output of the travel power source and the absolute value of the braking force on the front wheel caused by of the center differential.

3. The differential rotation limiting force control apparatus for the center differential according to claim 2, further comprising an inwardly headed state detection processor configured to make a detection of an inwardly headed state based on i) the yaw rate, ii) the vehicle speed and iii) the steering angle, the inwardly headed state being a state in which i) the vehicle is cornering and ii) the front side of the vehicle body is directed inwardly of cornering with respect to the vehicle's direction of travel, wherein
the limiting force control processor is configured to control the limiting force, in response to the detection of the inwardly headed state, to reduce a difference between a motive force on the rear wheel caused by the output of the travel power source and an absolute value of a braking force on the rear wheel caused by the internal circulation torque of the center differential.

4. The differential rotation limiting force control apparatus for the center differential according to claim 3, wherein
the limiting force control processor is configured to control the limiting force, in response to the detection of the inwardly headed state, to equalize the motive force on the rear wheel caused by the output of the travel power source and the absolute value of the braking force on the rear wheel caused by the internal circulation torque of the center differential.

5. The differential rotation limiting force control apparatus for the center differential according to claim 1, further comprising an inwardly headed state detection processor configured to make a detection of an inwardly headed state based on i) the yaw rate, ii) the vehicle speed and iii) the steering angle, the inwardly headed state being a state in which i) the vehicle is cornering and ii) the front side of the vehicle body is directed inwardly of cornering with respect to the vehicle's direction of travel, wherein
 the limiting force control processor is configured to control the limiting force, in response to the detection of the inwardly headed state, to reduce a difference between a motive force on the rear wheel caused by the output of the travel power source and an absolute value of a braking force on the rear wheel caused by the internal circulation torque of the center differential.

6. The differential rotation limiting force control apparatus for the center differential according to claim 5, wherein
 the limiting force control processor is configured to control the limiting force, in response to the detection of the inwardly headed state, to equalize the motive force on the rear wheel caused by the output of the travel power source and the absolute value of the braking force on the rear wheel caused by the internal circulation torque of the center differential.

7. A differential rotation limiting force control apparatus for a center differential, to be mounted on a vehicle including the center differential and a differential rotation limiting device, the center differential being configured to transmit a motive force generated by a travel power source to a front wheel driving device and a rear wheel driving device and permit differential rotation between the front wheel driving device and the rear wheel driving device, the front wheel driving device being configured to drive a front wheel of the vehicle, the rear wheel driving device being configured to drive a rear wheel of the vehicle, the differential rotation limiting device being configured to generate a limiting force that limits the differential rotation, the differential rotation limiting force control apparatus comprising:
 an inwardly headed state detection processor configured to make a detection of an inwardly headed state based on i) a yaw rate of a vehicle body of the vehicle, ii) a vehicle speed and iii) a steering angle, the yaw rate being detected by a yaw rate sensor of the vehicle, the vehicle speed being detected by a vehicle speed sensor of the vehicle, the steering angle being detected by a steering sensor of the vehicle, the inwardly headed state being a state in which i) the vehicle is cornering and ii) a front side of the vehicle body is directed inwardly of cornering with respect to a vehicle's direction of travel; and
 a limiting force control processor configured to control the limiting force, in response to the detection of the inwardly headed state, to reduce a difference between a motive force on the rear wheel caused by an output of the travel power source and an absolute value of a braking force on the rear wheel caused by internal circulation torque of the center differential.

8. The differential rotation limiting force control apparatus for the center differential according to claim 7, wherein
 the limiting force control processor is configured to control the limiting force, in response to the detection of the inwardly headed state, to equalize the motive force on the rear wheel caused by the output of the travel power source and the absolute value of the braking force on the rear wheel caused by the internal circulation torque of the center differential.

9. A differential rotation limiting force control apparatus for a center differential, to be mounted on a vehicle including the center differential and a differential rotation limiting device, the center differential being configured to transmit a motive force generated by a travel power source to a front wheel driving device and a rear wheel driving device and permit differential rotation between the front wheel driving device and the rear wheel driving device, the front wheel driving device being configured to drive a front wheel of the vehicle, the rear wheel driving device being configured to drive a rear wheel of the vehicle, the differential rotation limiting device being configured to generate a limiting force that limits the differential rotation, the differential rotation limiting force control apparatus comprising circuitry configured to:
 calculate a side-slip angle of a vehicle body of the vehicle based on i) a yaw rate of the vehicle body detected by a yaw rate sensor of the vehicle, ii) a vehicle speed detected by a vehicle speed sensor of the vehicle and iii) a steering angle detected by a steering sensor of the vehicle, the side-slip angle indicating an angle of the vehicle body relative to a vehicle's direction of travel in plan view with the vehicle viewed from above;
 make a detection of an outwardly headed state based on i) the yaw rate and ii) the slip-angle, the outwardly headed state being a state in which i) the vehicle is cornering and ii) a front side of the vehicle body is directed outwardly of cornering with respect to the vehicle's direction of travel; and
 control the limiting force, in response to the detection of the outwardly headed state, to reduce a difference between a motive force on the front wheel caused by an output of the travel power source and an absolute value of a braking force on the front wheel caused by internal circulation torque of the center differential.

10. The differential rotation limiting force control apparatus for the center differential according to claim 9, wherein
 the circuitry is further configured to control the limiting force, in response to the detection of the outwardly headed state, to equalize the motive force on the front wheel caused by the output of the travel power source and the absolute value of the braking force on the front wheel caused by the internal circulation torque of the center differential.

11. The differential rotation limiting force control apparatus for the center differential according to claim 10, wherein
 the circuitry is further configured to:
 make a detection of an inwardly headed state based on i) the yaw rate and ii) the slip-angle, the inwardly headed state being a state in which i) the vehicle is cornering and ii) a front side of the vehicle body is directed inwardly of cornering with respect to the vehicle's direction of travel; and
 control the limiting force, in response to the detection of the inwardly headed state, to reduce a difference between a motive force on the rear wheel caused by the output of the travel power source and an absolute value of a braking force on the rear wheel caused by the internal circulation torque of the center differential.

12. The differential rotation limiting force control apparatus for the center differential according to claim 11, wherein
 the circuitry is further configured to control the limiting force, in response to the detection of the inwardly headed state, to equalize the motive force on the rear wheel caused by the output of the travel power source and the absolute value of the braking force on the rear wheel caused by the internal circulation torque of the center differential.

13. The differential rotation limiting force control apparatus for the center differential according to claim 9, wherein the circuitry is further configured to:
    make a detection of an inwardly headed state based on i) the yaw rate and ii) the slip-angle, the inwardly headed state being a state in which i) the vehicle is cornering and ii) a front side of the vehicle body is directed inwardly of cornering with respect to the vehicle's direction of travel; and
    control the limiting force, in response to the detection of the inwardly headed state, to reduce a difference between a motive force on the rear wheel caused by the output of the travel power source and an absolute value of a braking force on the rear wheel caused by the internal circulation torque of the center differential.

14. The differential rotation limiting force control apparatus for the center differential according to claim 13, wherein
    the circuitry is further configured to control the limiting force, in response to the detection of the inwardly headed state, to equalize the motive force on the rear wheel caused by the output of the travel power source and the absolute value of the braking force on the rear wheel caused by the internal circulation torque of the center differential.

15. A differential rotation limiting force control apparatus for a center differential, to be mounted on a vehicle including the center differential and a differential rotation limiting device, the center differential being configured to transmit a motive force generated by a travel power source to a front wheel driving device and a rear wheel driving device and permit differential rotation between the front wheel driving device and the rear wheel driving device, the front wheel driving device being configured to drive a front wheel of the vehicle, the rear wheel driving device being configured to drive a rear wheel of the vehicle, the differential rotation limiting device being configured to generate a limiting force that limits the differential rotation, the differential rotation limiting force control apparatus comprising circuitry configured to:
    calculate a side-slip angle of a vehicle body of the vehicle based on i) a yaw rate of the vehicle body detected by a yaw rate sensor of the vehicle, ii) a vehicle speed detected by a vehicle speed sensor of the vehicle and iii) a steering angle detected by a steering sensor of the vehicle, the slip-angle indicating an angle of the vehicle body relative to a vehicle's direction of travel in plan view with the vehicle viewed from above;
    make a detection of an inwardly headed state based on i) the yaw rate and ii) the slip-angle, the inwardly headed state being a state in which i) the vehicle is cornering and ii) a front side of the vehicle body is directed inwardly of cornering with respect to the vehicle's direction of travel with a yaw rate and a side slip angle of a vehicle body of the vehicle having different signs; and
    control the limiting force, in response to the detection of the inwardly headed state, to reduce a difference between a motive force on the rear wheel caused by an output of the travel power source and an absolute value of a braking force on the rear wheel caused by internal circulation torque of the center differential.

16. The differential rotation limiting force control apparatus for the center differential according to claim 15, wherein
    the circuitry is further configured to control the limiting force, in response to the detection of the inwardly headed state, to equalize the motive force on the rear wheel caused by the output of the travel power source and the absolute value of the braking force on the rear wheel caused by the internal circulation torque of the center differential.

* * * * *